E. A. TERPENING.
TIRE ALARM.
APPLICATION FILED MAR. 19, 1909.
1,019,557.
Patented Mar. 5, 1912.
2 SHEETS—SHEET 1.
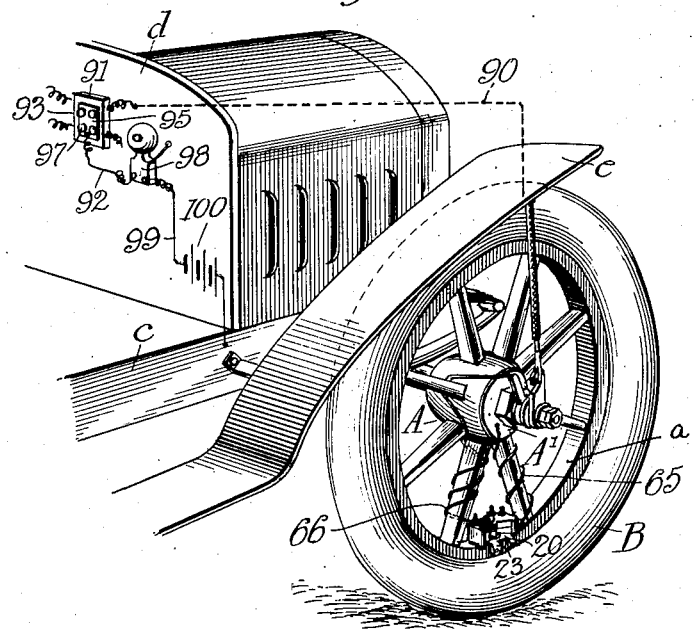

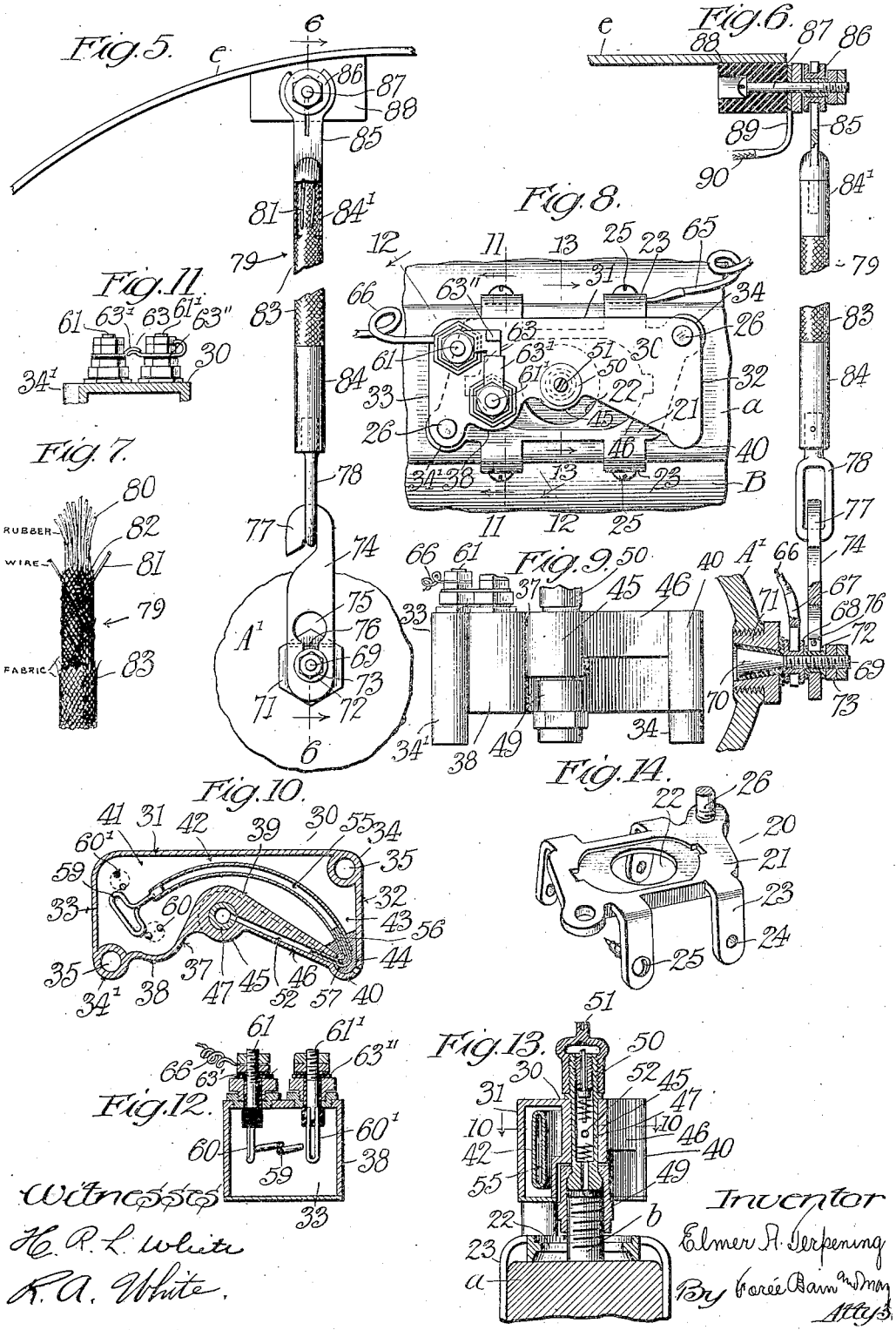

UNITED STATES PATENT OFFICE.

ELMER ALONZO TERPENING, OF MOKENA, ILLINOIS.

TIRE-ALARM.

1,019,557.  Specification of Letters Patent.  Patented Mar. 5, 1912.

Application filed March 19, 1909. Serial No. 484,368.

*To all whom it may concern:*

Be it known that I, ELMER A. TERPENING, a citizen of the United States, residing at Mokena, in the county of Will and State of Illinois, have invented certain new and useful Improvements in Tire-Alarms, of which the following is a specification.

My invention relates to improvements in tire alarms and has for its general object to provide satisfactory means, applicable to an automobile, for giving a signal or alarm upon the occurrence of undue pressure conditions within a pneumatic tire upon such automobile.

The general plan of my invention is to provide upon the wheel a pressure responsive device properly associated with the tire to be governed by the pressure conditions existing within the tire; and to provide the same pressure responsive device with electrical attachments leading to the body of the vehicle, such that the movement of the pressure responsive device to indicate an undue pressure condition—either high or low—within the tire initiates an electrical signal. In the provision of a commercially practical device for attaining these general objects, however, many difficulties have to be overcome, particularly in the provision of a pressure responsive device applicable to any automobile wheel of the ordinary "artillery" type, irrespective of pecularities of its rim-and-spoke contour, size, brake attachments and the like; and in the provision of suitable electrical connections between the pressure responsive device rotating with the wheel and the alarm or signaling devices, located on the body of the vehicle.

My invention is designed to provide suitable means for satisfying these practical demands and resides in the features of construction and arrangement of parts hereinafter more fully described and specified in the claims.

In the drawings, wherein I have illustrated an embodiment of my invention; Figure 1 is a perspective view of a portion of an automobile showing a wheel equipped with an alarm device embodying my invention, the alarm devices being generally exaggerated for clearness. Figs. 2, 3, and 4 are illustrations, respectively in perspective; in horizontal section, and in vertical section, of a switch device for the several circuit connections to be established to the different pressure indicating devices on the several wheels. Fig. 5 is an enlarged elevation, with parts broken away, of the means preferably employed for effecting electrical connection between the body and the wheel; and, Fig. 6 is a section on line 6—6 of Fig. 5. Fig. 7 is a view showing a fragment of the elastic electrical conductor shown in Figs. 5 and 6, illustrating the several parts of the construction. Fig. 8 is a plan view of the pressure gage as applied to the wheel rim. Fig. 9 is a side view of the gage. Fig. 10 is a horizontal section through the pressure gage. Fig. 11 is a section on line 11—11 of Fig. 8. Fig. 12 is a section on line 12—12 of Fig. 8. Fig. 13 is a section on line 13—13 of Fig. 8; and, Fig. 14 is a perspective detail of the gage-base.

In the particular construction illustrated I provide for attachment to the rim or felly *a* of an ordinary wheel, A, a base for supporting a pressure gage, preferably as illustrated in Fig. 14, said base, generally designated at 20, comprising a plate 21 provided with a central aperture 22 to receive a valve stem *b* of a pneumatic tire B, and having projecting therefrom suitable attaching arms 23 provided with screw apertures 24, said arms being of material which may readily be bent to conform to the particular shape of the felly or rim, to be conveniently attached thereto as by screws 25. At diagonally opposite corners of the base are supported projecting guide rods 26, which when the base is attached to the rim or felly, project inward in parallelism, toward the hub of the wheel.

The pressure gage structure, generally indicated at 30 as best shown in Figs. 8 to 13, preferably consists of a hollow casing completely closed, when finished, having what I will term its rear walls 31 and the end walls 32 and 33 substantially straight and having post abutments 34 and 34′ provided at diagonally opposite corners, perforated as at 35 to slip upon the guide posts 26 of the base, heretofore described. The front wall 37 of the chamber preferably provides adjacent the post 34′ a straight portion 38, and therebeyond a reëntrant angular portion 39, extending sharply inward from the portion 38 and thence at a more gradual angle forward and toward the wall 32, which it meets with a swell 40. Thus, interiorly, the gage casing provides adjacent the end 33 a head enlargement 41; near the middle of its length a narrow waist 42 and adjacent its opposite end a foot enlargement 43 terminating within the swell 40 in a recess 44. Exteriorly the front wall is thickened at the apex of the reëntrant angle, to provide a vertical post 45, extending from the top of the casing a suitable distance downward, preferably somewhat more than half the depth of the casing, and a thickened rib 46 extending along the upper half of the front of the casing from such post to the swell 40. The vertical post 45 is vertically bored to receive, or has cast therein, if desired, a sleeve 47, projecting at its bottom and top. The sleeve carries at its bottom a suitable coupling 49 extending down within the reëntrant angle at the front of the casing, preferably below the lower edge of the casing for convenient access, said coupling being of any suitable description to afford adequate air tight connection between the sleeve 47 and the usual valve stem $b$ of the penumatic tire B. The upper end of the sleeve 47 carries a valve 50 of any suitable construction, preferably an ordinary pneumatic tire valve, provided with the customary cap 51. From the swell 40 a small duct 52 is drilled, said duct opening into the recess 44 within the swell 40, and extending thence into communication with the sleeve 47. The pressure responsive element of the gage is a short Bourdon tube 55, curved to fit within the casing and extends from the recess 44 through the narrow waist 42 into the head enlargement 41 of the casing. To connect the foot end of the gage tube 55 with its interior in open communication with the duct 52, but otherwise to hermetically seal said tube-end, I employ a short length of very fine tubing 56 bent into staple shape with one end inserted into duct 52 from the recess 44 and its other end extending into the Bourdon tube 55, and with the tube 56 thus positioned I flood the corner of the casing, including the recess 44, with solder 57, to a level somewhat below the reach of the ends of tube 56, thereby hermetically sealing the foot end of the Bourdon tube inside and out, save for the passage afforded through the connecting tube 56, and thereby also rigidly attaching the Bourdon tube to the casing. This construction I have found in practice to be most effective as a means of securing and sealing the Bourdon tube for positively insuring its open connection with the pressure supply duct 52.

The head or free end of the Bourdon tube 55, is closed in any suitable manner and carries a movable electric contact, preferably in the form of a wire loop 59, normally lying diagonally in the head chamber 41 of the casing. Two relatively stationary but adjustable contacts, insulated from the casing are provided for coaction with the contact 59, such stationary contacts 60 and 60' being preferably vertical wire loops rotatably supported from the top of the casing so that by turning them to vary their presentation to the movable contact the range of movement of said contact 59 necessary to bring it into contact with either of the stationary loops, may be varied.

As shown in Fig. 12, the stationary contact loops 60 and 60' are electrically connected with binding posts 61, 61' insulated from the casing, and bearing appropriate nuts for securing a wire thereto. Preferably further a switch is provided for electrically connecting or disconnecting the two binding posts 61 and 61', such switch 63 preferably providing a stationary contact arm 63' upon post 61 and the movable contact arm 63' upon post 61', as best shown in Figs. 11 and 12.

For establishing electrical connections for the pressure responsive device the casing to which the foot end of the Bourdon tube is connected, is grounded to the metallic parts or frame of the machine, and to this end a wire 65 is run from a point of contact with the base 20 up around a spoke of the wheel to a metallic part thereof, such as the hub-cap, electrically connected with the frame. The contact 60 for the free end of the Bourdon tube, which is the low pressure contact, has connected thereto a wire 66, which is run around a spoke of the machine and suitably across the hub, for electrical connection only with an insulated conductor extending to the body of the machine, for connection with the alarm devices thereon.

As best shown in Fig. 6 the wire 66 has at its extremity a clip 67 which engages in an annular groove in a nut 68, screwed upon a bolt 69, which has a tapered base 70, driven into, but completely insulated from the tapered bore of a nut 71, screwed into a precise center of a hub-cap A' of the wheel. Upon the bolt 69 is also screwed a sleeve 72, secured in position by a nut 73, said sleeve being preferably annularly recessed and made of some good wearing material, such as steel. A shackle 74 provided near its lower end with a key hole opening 75, is slipped on the sleeve 72, and preferably secured against detachment by a pin 76, so that it bears upon and makes constant electrical connection with the sleeve and the parts electrically connected thereto. The upper end of the shackle is provided with a hook 77, which engages a loop 78 connected with an elastic or extensible electric conductor structure 79. The conducting structure 79 I have found in practice should be elastic to compensate for relative movements of the body and wheel; supported at both ends for swinging movement so that lateral bending of the conductor may be avoided; and presenting a relatively smooth exterior, so as not to catch leaves, twigs and the like as would an ordinary spiral spring. A suitable construction is illustrated in Fig. 7, such conductor preferably comprising an elastic core 80 made up of a bundle of fine rubber strands, having woven or coiled thereabout a suitable number of fine wires (preferably of a high grade of phosphor bronze) each longer than the normal length of the core and preferably interwoven with strands of insulating material 82 which serves to protect the conducting strands and space them apart; the entire structure being overlaid and insulated by an outer extensible casing 83, of tough insulating fabric woven thereon. The ends of a suitable length of the elastic conductor 79, are inclosed in metallic ferrules 84, 84', the extremities of the wires 81 being brought out and bent back, as shown in Fig. 5 to make contact with the ferrules and the latter receiving and making contact with the suitable terminal clips. The upper terminal clip 85, which is preferably a split spring construction, engages a grooved sleeve 86 rotatably mounted on a bolt 87, carried by an insulating block secured on appropriate part of the automobile, such as the mud guard, the bolt 87 bearing also a clip 89, having connected thereto a wire 90. In making the connections for the front wheels it is preferable to carry the elastic connectors 79 vertically upward to the mud guards so that they may not be interfered with by the wheels when the wheels are turned on vertical axes to steer the machine. With respect to the rear wheels the direction in which the elastic conductor is run is practically immaterial. The wires 90 from the several bolts 87 are led around the machine in any convenient manner, determined by the particular construction of the machine being wired, to a suitable switch structure 91, whereby connection of each wire 90 with a common wire 92 leading to the bell and battery may be made and broken at will.

In the specific construction of switch shown in Figs. 2 to 4, 93 indicates an insulating block provided with four transverse posts 94, insulated from each other and each having a terminal binding post to which one of the wires 90 may be connected, there being provided upon the block a metallic bus bar or plate 95, through which extend contact screws 96 provided with operating knobs 97, so that when screwed home each screw 96 may contact with one of the posts 94, so connecting it with the bus bar 95. The wire 92 is connected to the bus bar 95 and at its other end with an electroresponsive alarm, or signal device, 98, herein shown as an electric bell, having its other terminal connected by a wire 99 through a battery 100 and to the frame c. The switch structure 91 and the alarm may be mounted on the dash-board d of the vehicle and the battery and fixed wiring may be located in any suitable place. In the attachment of the device the valve within valve stem b of the tire B is either removed or held constantly open in any suitable fashion so that the pressure within the tire may be communicated through the stem b coupling 49, sleeve 47, duct 52, and the reduced tube 56 to the Bourdon tube 55. The contact parts are so adjusted that when the Bourdon tube stands in the position to which it is forced by the normal pressure of the tire it is between the low pressure contact 60 and the high pressure contact 60', and said contacts are so adjusted that by a predetermined drop or rise in the pressure electrical connection between the movable contact 59 and one of the stationary contacts will be made by reason of the pressure responsive movement of the Bourdon tube. When contact is made between the part 59 carried by the Bourdon spring and either of the contacts 60 and 60' a circuit is established as follows: from the battery 100 through the common wire 99, bell 98, switch 91, wire 90, bolt 87, elastic conductor 79, shackle 74, bolt 69 and its connections, wire 66, the closed contact to the pressure responsive device, the supporting frame of said device, wire 65 to the metallic parts of the automobile and thence back to the battery through the grounded terminal-connection thereof.

When the automobile is in transit and contact is made through any pressure responsive device thereon, the driver may readily learn which wheel is affected by loosening, one after another, the switch screws 96 until he finds which one when loosened causes the cessation of alarm signal. Of course, the wheel wired to the contact post wherewith such screw coacts is the one affected. The driver should then close such contact again, starting the signal in operation, and after stopping his car determine whether the trouble in the tire is due to high or low pressure. This may readily be done by simply opening the small switch 63. If the trouble is due to high pressure, such opening of the switch will cause a cessation of the operation of the alarm whereas if it is due to low pressure the alarm will continue to ring as the permanent connection of the alarm circuit is with the low pressure contact. The tire may be pumped up or pressure relieved through valve 50.

It will now be apparent that by the construction and arrangement of parts hereinbefore described, I provide a gage construction of such small size and yet with such a relatively wide range of pressure adjustment that it may be applied to any style of wheel having a tire built for any usual pressure and to interfit with any standard valve irrespective of its precise projection from the rim or felly. It will be observed that the gage, radially supported by the valve stem, and guided by the rods upon the base, may move radially as the tire swells or contracts in pumping up or exhausting, but throws no lateral strains on the valve stem.

Also it will be observed I provide efficient and durable connecting devices for establishing the desired electrical connections from wheel to body, and means for readily ascertaining which particular tire is affected and the character of the trouble affecting it.

While for clearness of disclosure I have herein described a particular embodiment of my invention which I have used in practice and have found to be successful, it will be understood by those skilled in the art that numerous variations might be made in the specific construction without departure from the spirit and scope of my invention.

Having described my invention, what I claim is:

1. The combination with a vehicle wheel having a pneumatic tire, provided with a valve stem, of a pressure gage provided with a coupling attached to the valve stem, a guide member slidably engaging said gage and secured in fixed relation to the wheel, and an alarm device operatively associated with said gage.

2. The combination with a vehicle wheel provided with a pneumatic tire, of a tire alarm comprising a pressure responsive gage, means for supporting said gage between the spokes in connection with a valve stem comprising a positive connection between the gage and valve stem, and a guiding connection between the gage and the wheel structure, and an alarm device operatively associated with said gage.

3. The combination with an automobile wheel provided with a pneumatic tire having an inwardly projecting valve stem, of a pressure gage arranged for support in a radial direction upon the valve stem, a guide secured to the wheel engaging the gage and an alarm device operatively associated with said gage.

4. The combination with an automobile wheel, provided with a pneumatic tire, having a valve stem projecting inwardly toward the hub of the wheel, of a pressure gage adapted to be positioned between the spokes of the wheel, provided on one side with a coupling for connecting said gage to the valve stem to receive support therefrom, and upon another side with an inflation valve, and an alarm device operatively associated with said gage.

5. In a tire alarm, the combination with a vehicle wheel provided with a pneumatic tire having a valve stem projecting radially inward, of a closed casing, a coupling carried by said casing for connecting said casing to the tire valve stem, an inflation valve carried by said casing on another side thereof, a Bourdon tube within the casing having communication with said coupling and valve, and a signal device operatively associated with said Bourdon tube.

6. In a tire alarm, a pressure gage for connection with a wheel between the spokes thereof comprising a closed casing, a Bourdon tube within said casing, a coupling carried by said casing in open communication with the tube, adapted for connection with the valve stem of a pneumatic tire valve, an inflation valve carried by said casing in open communication with said coupling, and an alarm device operatively associated with said gage.

7. In a tire alarm, the combination with a vehicle wheel provided with a pneumatic tire, having a valve stem, of a pressure gage comprising a casing having a reëntrant front wall, a post enlargement extending part of the depth of the reëntrant angle, a coupling extending from one side of the post to connect with the valve stem of the tire, and an inflation valve connected with the opposite end of said post, a Bourdon tube within the casing, said tube, valve and coupling communicating with one another through the post, and signaling devices operatively associated with said pressure gage.

8. In a tire alarm the combination with a vehicle wheel having a pneumatic tire provided with an inwardly projecting valve stem, a base secured to a wheel part adjacent said valve stem and provided with guides parallel with the stem, and a pressure gage mounted upon said guides, provided with means for attaching it to the valve stem of the tire to receive radial support therefrom, and signaling devices operatively associated with said pressure gage.

9. In a tire alarm, a structure for association with the wheel between two spokes thereof, comprising a base adapted to engage the wheel part, provided with an aperture for the valve stem of the wheel tire, parallel guides extending inwardly from said base, a casing slidingly mounted on said guides, a pressure responsive device within the casing, a coupling communicating with said pressure responsive device adapted to engage the tire valve stem and to connect the casing therewith for radial support, and signaling devices operatively associated with the pressure gage.

10. In a tire alarm, the combination with a vehicle provided with pneumatic tired wheels, of a pressure gage mounted upon a wheel for rotation therewith and having communication with the tire, an alarm device mounted on the body of the vehicle and electrical connections between the gage and alarm including an extensible electric conductor affording connection between a part of the vehicle body and a part on the axis of a wheel.

In testimony whereof I hereunto set my hand in the presence of two witnesses.

ELMER ALONZO TERPENING.

In the presence of—
GEORGE T. MAY, Jr.,
MARY F. ALLEN.